US010618573B2

United States Patent
Demetrio et al.

(10) Patent No.: US 10,618,573 B2
(45) Date of Patent: Apr. 14, 2020

(54) SYSTEM AND METHOD FOR CONTROLLING AN ACTIVE AERODYNAMIC MEMBER

(71) Applicant: GM GLOBAL TECHNOLOGY OPERATIONS LLC, Detroit, MI (US)

(72) Inventors: Timothy D. Demetrio, Highland, MI (US); Joshua R. Auden, Brighton, MI (US); Frederick P. Miesterfeld, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/784,601

(22) Filed: Oct. 16, 2017

(65) Prior Publication Data

US 2019/0111979 A1    Apr. 18, 2019

(51) Int. Cl.
*B62D 35/00* (2006.01)
*B62D 37/02* (2006.01)
*B62D 35/02* (2006.01)

(52) U.S. Cl.
CPC ......... *B62D 35/007* (2013.01); *B62D 35/005* (2013.01); *B62D 37/02* (2013.01); *B62D 35/02* (2013.01)

(58) Field of Classification Search
USPC .................................................... 701/49.001
See application file for complete search history.

(56) References Cited

U.S. PATENT DOCUMENTS

| 4,810,022 A * | 3/1989 | Takagi | B62D 35/005 |
| | | | 296/180.5 |
| 9,187,093 B1 * | 11/2015 | Sujan | B60W 30/14 |
| 2007/0257512 A1 * | 11/2007 | Anderson | B62D 35/00 |
| | | | 296/180.1 |
| 2016/0207525 A1 * | 7/2016 | Nefcy | B60K 6/383 |
| 2017/0001639 A1 * | 1/2017 | Dempsey | B60W 30/146 |
| 2018/0319443 A1 * | 11/2018 | Morrison | B62D 35/001 |
| 2018/0362149 A1 * | 12/2018 | Huynh | B64C 13/503 |

* cited by examiner

*Primary Examiner* — James M McPherson
*Assistant Examiner* — Sharon Carlson

(57) ABSTRACT

An automotive vehicle includes a body. A movable member with first and second positions having distinct aerodynamic profiles is disposed on an exterior portion of the body. An actuator is coupled to the movable member and configured to actuate the movable member between the first and second positions. A sensor is configured to, during a drive cycle, detect a relative road load between the second aerodynamic profile and the first aerodynamic profile. A controller is configured to, during a drive cycle, control the actuator to move the movable member to the first position in response to satisfaction of a first operating condition, to control the actuator to move the movable member to the second position in response to satisfaction of a second operating condition, and to, in response to the relative road load being positive, control the actuator to move the movable member to the first position.

17 Claims, 3 Drawing Sheets

SYSTEM AND METHOD FOR CONTROLLING AN ACTIVE AERODYNAMIC MEMBER

TECHNICAL FIELD

The present disclosure relates to automotive vehicles, and more particularly to aerodynamic features of automotive vehicles.

INTRODUCTION

As an automotive vehicle travels, it disturbs the air through which it passes. This air disturbance has an impact on energy consumption of the automotive vehicle, among other factors. Overcoming wind resistance and turbulence generated by the passage of the vehicle expends energy, which must be obtained from fuel, electricity, or other stored energy of the vehicle. The greater the wind resistance and turbulence, the greater the expenditure of fuel and the lower the fuel economy. Vehicles are therefore generally designed with aerodynamic performance in mind. In conventional vehicle design aerodynamic features were generally fixed body structures on the exterior of the vehicle. However, recently, actively movable aerodynamic features have been implemented on some vehicles.

SUMMARY

An automotive vehicle according to the present disclosure includes a body and a movable member disposed on an exterior portion of the body. The movable member had a first position and a second position. The first position has a first aerodynamic profile and the second position has a second aerodynamic profile which is distinct from the first aerodynamic profile. The vehicle additionally includes an actuator coupled to the movable member. The actuator is configured to actuate the movable member between the first position and the second position. The vehicle also includes a sensor configured to, during a drive cycle, detect a relative road load between the second aerodynamic profile and the first aerodynamic profile. The vehicle further includes a controller configured to, during a drive cycle, control the actuator to move the movable member to the first position in response to satisfaction of a first operating condition, to control the actuator to move the movable member to the second position in response to satisfaction of a second operating condition, and to, in response to the relative road load being positive, control the actuator to move the movable member to the first position.

In an exemplary embodiment, the second operating condition includes vehicle acceleration being below a calibrated acceleration threshold and vehicle speed being above a calibrated speed threshold.

In an exemplary embodiment, the first operating condition includes a detected vehicle speed, and the controller is configured to control the actuator to move the movable member to the first position based on an actuator setting obtained from a lookup table based on the detected vehicle speed.

In an exemplary embodiment, the actuator is configured to actuate the movable member continuously between the first and second positions.

In an exemplary embodiment, the movable member has a third position having a third aerodynamic profile which is distinct from the first aerodynamic profile and from the second aerodynamic profile. In such an embodiment, the actuator is further configured to actuate the movable member to the third position, and the controller is further configured to, in response to the relative road load being negative, control the actuator to move the movable member to the third position.

A method of controlling a vehicle according to the present disclosure includes detecting a first vehicle operating condition and, in response to detecting the first vehicle operating condition, automatically controlling, via a controller, an actuator coupled to an active aerodynamic device to a first setting. The method additionally includes detecting a second vehicle operating condition and, in response to detecting the second vehicle operating condition with the actuator in the first setting, automatically controlling, via the controller, the actuator to a second setting. The method further includes determining, via the controller, a relative road load between the second setting and the first setting, and in response to the relative road load being positive, automatically controlling, via the controller, the actuator to the first setting.

In an exemplary embodiment, the second operating condition includes vehicle acceleration being below a calibrated acceleration threshold and vehicle speed being above a calibrated speed threshold.

In an exemplary embodiment, the actuator is configured to continuously actuate between the first and second settings.

In an exemplary embodiment, the method additionally includes, in response to the relative road load being negative, automatically controlling, via the controller, the actuator to a third setting, wherein the second setting is between the first setting and the third setting. Such embodiments may also include determining, via the controller, a second relative road load between the third setting and the second setting, and, in response to the second relative road load being positive, automatically controlling, via the controller, the actuator to the second setting. Such embodiments may include comprising storing the second setting in nonvolatile vehicle memory for access during a subsequent drive cycle.

In an exemplary embodiment, the method additionally includes automatically controlling, via the controller, the actuator to a third setting, wherein the first setting is between the third setting and the second setting. Such embodiments may additionally include determining, via the controller, a second relative road load between the third setting and the first setting, and, in response to the second relative road load being positive, automatically controlling, via the controller, the actuator to the first setting.

An active aerodynamic system according to the present disclosure includes a movable member disposed on an exterior portion of the vehicle. The movable member has a first position and a second position, which is distinct from the first position. The system additionally includes an actuator coupled to the movable member and configured to actuate the movable member between the first position and the second position. The system also includes a sensor configured to, during a drive cycle, detect a relative road load between the second position and the first position. The system further includes a non-transient data storage provided with an actuator calibration. The system further includes a controller. The controller is configured to, during a drive cycle, control the actuator to move the movable member to a first position based on the actuator calibration. The controller is also configured to, in response to the vehicle being in a steady state with the movable member in the first position, automatically control the actuator to the second position. The controller is further configured to, in response to the relative road load being negative, modify the actuator calibration based on the second position.

Embodiments according to the present disclosure provide a number of advantages. For example, systems and methods according to the present disclosure may provide for on-vehicle optimization of the calibration for an active aerodynamic device, thereby reducing time and expense associated with calibrating such calibrations using wind tunnel experimentation or simulations. Moreover, systems and methods according to the present disclosure may modify calibrations for active aerodynamic devices as needed in response to changes in aerodynamic performance such as attachment of a trailer to a vehicle.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles may be provided with one or more active aerodynamic devices. An active aerodynamic device refers to an aerodynamic member which may be actuated among a plurality of distinct positions presenting different aerodynamic profiles. The active aerodynamic device(s) may thereby be actuated during a drive cycle to vary aerodynamic attributes of the vehicle such as drag or downforce.

Figure 1:
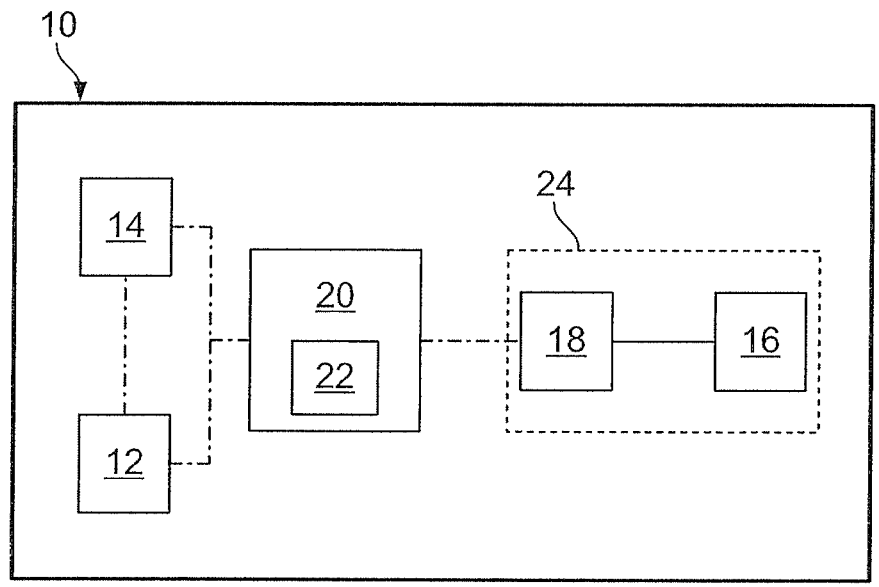
FIG. 1 is a schematic illustration of a vehicle according to an embodiment of the present disclosure.

Referring now to FIG. 1, a schematic view of a vehicle 10 according to the present disclosure is illustrated. The vehicle 10 includes a powertrain 12. In an exemplary embodiment, the powertrain 12 includes an internal combustion engine; however, in other embodiments the powertrain 12 may have other configurations such as a pure electric or fuel cell powertrain. The vehicle 10 additionally includes at least one sensor 14. In an exemplary embodiments, at least one respective sensor 14 is configured to detect a road load of the vehicle 10. In the embodiment illustrated in FIG. 1, at least one of the sensor(s) 14 is associated with the powertrain 12. In the illustrated embodiment, the sensor(s) 14 may include a fuel flow sensor configured to monitor fuel consumption of the powertrain 12, a torque sensor configured to monitor torque output by the powertrain 12, or other sensors configured to otherwise monitor load on the powertrain 12. However, in other embodiments, other sensors capable of monitoring road load may be implemented. In addition, the sensor(s) 14 may include additional sensors such as a vehicle speed sensor, a steering position sensor, and an accelerometer.

The vehicle 10 additionally includes at least one active aerodynamic system 24 including at least one movable aerodynamic member 16. The active aerodynamic system(s) 24 may include an active rear wing as will be discussed in further detail below with respect to FIG. 2, an active underbody air deflector as will be discussed in further detail below with respect to FIG. 3, other active aerodynamic devices, or a combination thereof. The movable aerodynamic member(s) 16 is movable between a plurality of distinct positions. The active aerodynamic system(s) 24 include at least one actuator 18 coupled to the movable aerodynamic member(s) 16 and configured to move the movable aerodynamic member(s) 16 among the plurality of positions. The actuator(s) 18 may include a linear actuator, an electric motor, a smart material actuator, any other appropriate actuator, or a combination thereof.

The powertrain 12, the sensor(s) 14, and the actuator(s) 18 are in communication with or under the control of a controller 20. While depicted as a single unit, the controller 20 may include one or more additional controllers collectively referred to as a "controller." The controller 20 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 20 is in communication with a nontransient data storage medium 22. The data storage medium 22 is provided with control information for controlling the actuator(s) 18, as will be discussed in further detail below. In an exemplary embodiment, the control information includes a lookup table with default actuator settings based on one or more vehicle parameters detectable by the sensor(s) 14 such as vehicle speed, acceleration, and turning.

Figure 2:
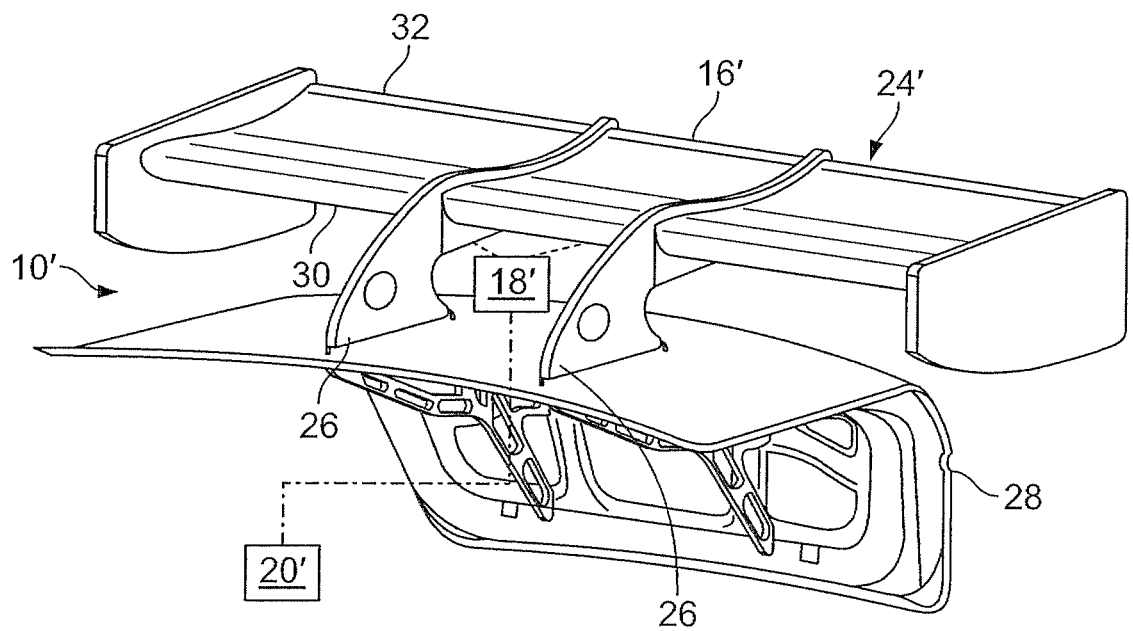
FIG. 2 is an illustration of an active aerodynamic device according to a first embodiment of the present disclosure.

Referring now to FIG. 2, an isometric view of an exemplary active aerodynamic device 24' for an automotive vehicle 10' is shown. In this embodiment the active aerodynamic device 24' may be referred to as a rear wing 24'; however, other embodiments within the scope of the present disclosure include other types of active aerodynamic devices. The rear wing 24' is coupled to a rear portion 28 of the vehicle 10' by at least one stanchion 26. The rear wing 24' includes an elongate aerodynamic member or airfoil 16'. The airfoil 16' has a suction surface 30 facing a ground plane and a pressure surface 32 facing away from a ground plane. Thus, as air flows over the airfoil 16', a pressure differential between the pressure surface 32 and the suction surface 30 arises, and a downforce is exerted on the rear portion 28 of the vehicle 10'.

At least one actuator 18' is arranged to pivot the airfoil 16', e.g. to adjust an angle of attack of the airfoil 16'. According to various embodiments, the actuator 18' may be configured to pivot the airfoil 16' relative to the stanchion(s) 26, to pivot one portion of the stanchion(s) 26 relative to another portion of the stanchion(s) 26, or other appropriate configuration for adjusting the angle of attack of the airfoil 16'. The actuator 18' may be controlled by a controller 20' to pivot the airfoil 16' between different positions during a drive cycle in response to, for example, vehicle speed and lateral acceleration. By pivoting the airfoil 16', the downforce and drag generated by the airfoil 16' may be modified based on current operating conditions.

Figure 3A:
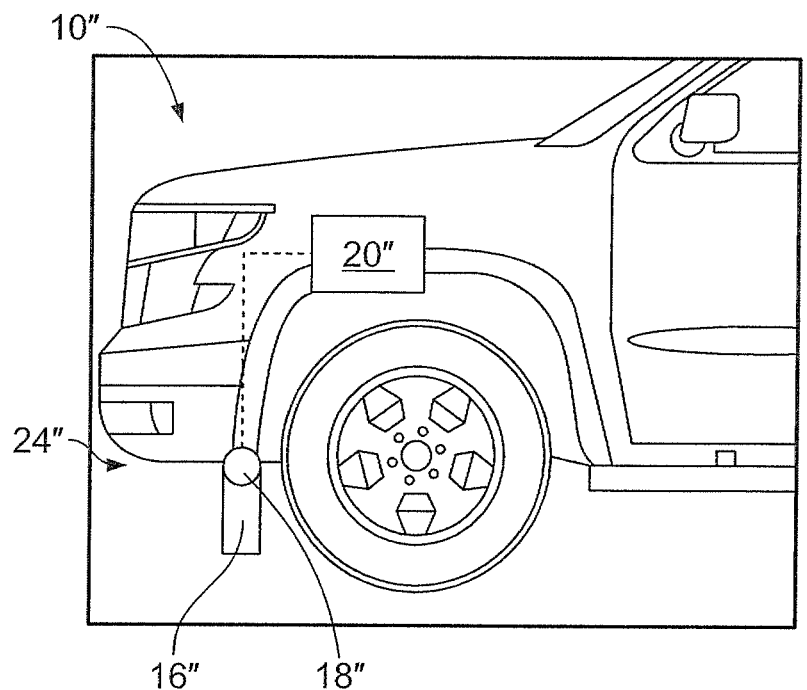
FIGS. 3A and 3B are illustrations of an active aerodynamic device according to a second embodiment of the present disclosure.
Figure 3B:
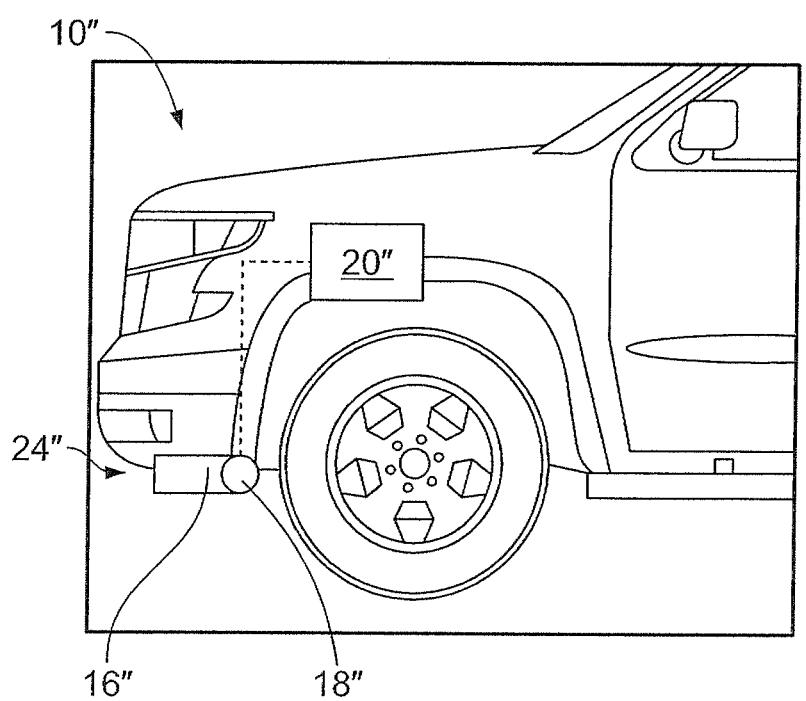

Referring now to FIGS. 3A and 3B, a view of a second exemplary active aerodynamic device 24" for an automotive vehicle 10" is shown. In the embodiment of FIGS. 3A and 3B, a vehicle 10" is provided with an active aerodynamic device 24", which may be referred to as an air deflector 24". The air deflector 24" includes a movable member 16", coupled to an actuator 18". The actuator 18" is configured to pivot the movable member 16" about a generally horizontal pivot axis extending laterally across the vehicle. The actuator 18" is under the control of a controller 34". The controller is configured to control the actuator 18" to move the movable member 16" between a blocking position, as illustrated in FIG. 3A, and a cooling position, as illustrated in FIG. 3B. In the blocking position, the air deflector 24" functions as an air dam, inhibiting the passage of air under the vehicle 10" and thereby decreasing drag. In the cooling position, the movable member 16" is pivoted to present a different blockage pattern, deflecting air toward vehicle wheels to thereby increase cooling of vehicle brakes.

Known active aerodynamic systems are controlled according to a predefined calibration scheme, e.g. a lookup table including actuator settings corresponding to speed or acceleration values. The calibration scheme is generally designed for a preferred characteristic at a given operating condition, e.g. decreased drag or increased downforce. The optimum actuator setting is affected by a variety of vehicle factors such as body style, suspension, tires, wheelbase, and is therefore specific to a particular variant of a vehicle. The predefined calibration scheme is generally determined based on wind tunnel testing or simulation. However, because the testing or simulation are repeated for each new vehicle or new variant of a vehicle, this calibration process may be relatively time-intensive. Moreover, the calibration is generally defined for a vehicle under nominal operating conditions, and may not account for factors which may vary real-world aerodynamic performance such as the presence of a towed trailer.

Figure 4:
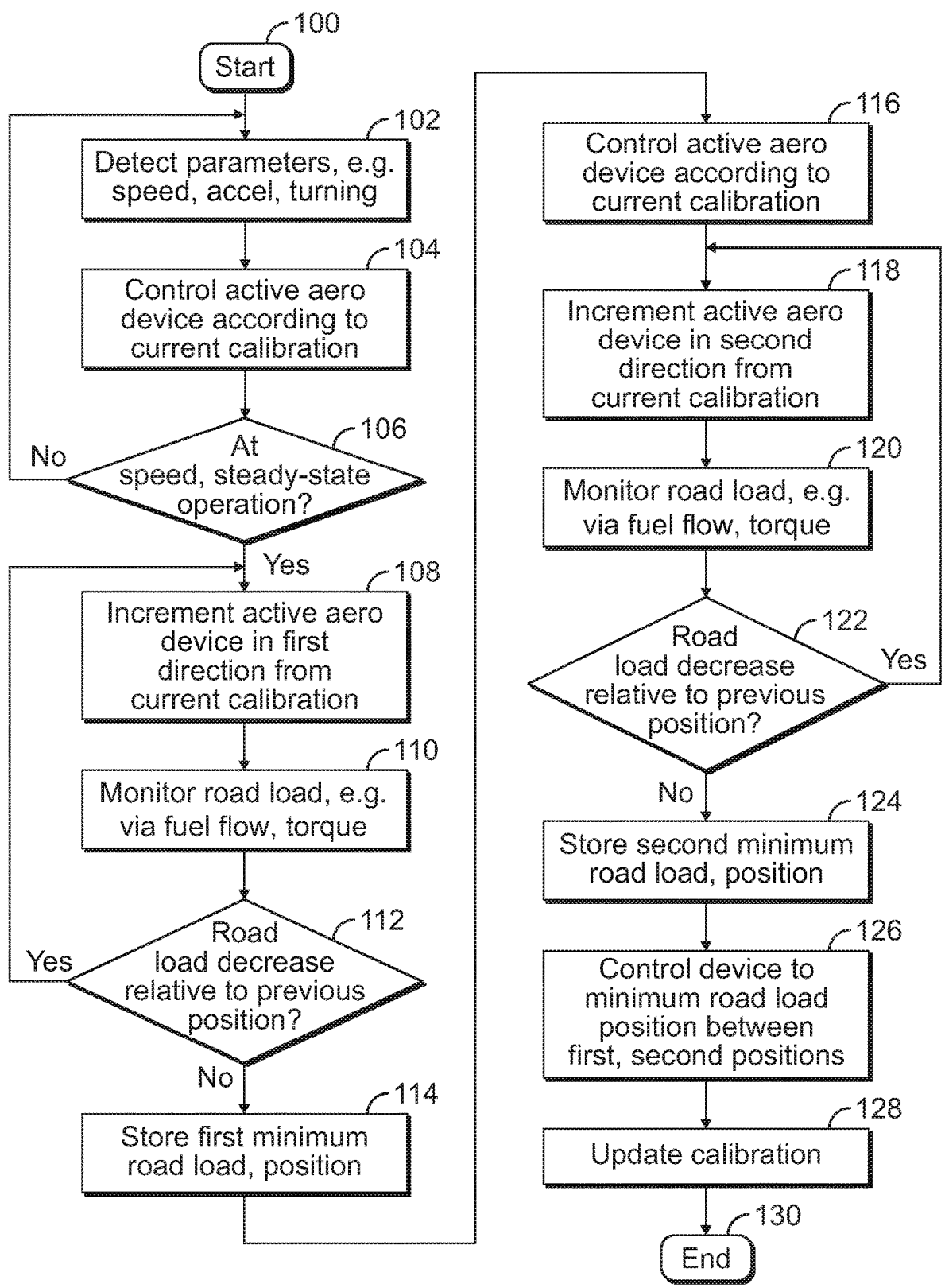
FIG. 4 is a flowchart representation of a method of controlling an active aerodynamic device according to an embodiment of the present disclosure.

Referring now to FIG. 4, a method of controlling a vehicle according to an embodiment of the present disclosure is illustrated in flowchart form. The algorithm begins at block 100.

Current vehicle parameters are detected, as illustrated at block 102. The vehicle parameters may be detected by one or more sensors, including but not limited to a vehicle speed sensor, a steering position sensor, and an accelerometer. In an exemplary embodiment, the vehicle parameters include speed, acceleration, and turning. Other parameters or combinations of parameters may be measured in other embodiments.

An active aerodynamic device is controlled according to a current calibration, as illustrated at block 104. This may include controlling an actuator to a setting obtained from a lookup table based on the vehicle parameters detected at block 102. If the algorithm has not been run previously, the current calibration may be a default calibration provided by a vehicle manufacturer. If the algorithm has been run, then the current calibration may be modified relative to the default calibration as will be discussed in further detail below.

A determination is made of whether the vehicle is at speed and in generally steady-state operation, as illustrated at operation 106. In an exemplary embodiment, this determination includes determining whether current vehicle acceleration is below a predefined threshold with vehicle speed being above a predefined threshold.

If the determination of operation 106 is negative, then control returns to block 102. The active aerodynamic device is thereby controlled according to the current calibration unless and until the vehicle is in generally steady-state operation.

If the determination of operation 106 is positive, then the active aerodynamic device is incremented in a first direction relative to the current calibration, as illustrated at block 108. In an exemplary embodiment, this is performed by controlling an actuator to a more deployed or more retracted setting relative to the current calibration.

Vehicle road load is monitored during the change in aerodynamic device position, as illustrated at block 110. This may include, e.g., monitoring fuel consumption rate or engine torque. A decrease in fuel consumption rate or engine torque may correspond to a decrease in road load, and likewise to a decrease in drag and to a more desirable position for the active aerodynamic device under current operating conditions.

A determination is made of whether the current active aerodynamic device position has a negative relative road load compared to the previous active aerodynamic position, i.e. has a lower road load than the previous active aerodynamic device position, as illustrated at block 112. If the determination is positive, then control returns to block 108. The active aerodynamic device is thereby incremented in the first direction until the road load no longer decreases.

If the determination is negative, a first minimum road load and position are stored, as illustrated at block 114. The first minimum road load and position correspond to the minimum road load value measured while the active aerodynamic device was swept in the first direction, and to the active aerodynamic device position at which that road load value was obtained.

The active aerodynamic device is then returned to the position according to the current calibration, as illustrated at block 116. As discussed above, this may include controlling an actuator to a setting obtained from a lookup table based on the vehicle parameters detected at block 102.

The active aerodynamic device is incremented in a second direction relative to the current calibration, as illustrated at block 118. In an exemplary embodiment, this is performed by controlling an actuator in an opposite direction relative to that in block 108.

Vehicle road load is monitored during the change in aerodynamic device position, as illustrated at block 120. As discussed above this may include, e.g., monitoring fuel consumption rate or engine torque.

A determination is made of whether the current active aerodynamic device position has a negative relative road load compared to the previous active aerodynamic position, i.e. has a lower road load than the previous active aerodynamic device position, as illustrated at block 122. If the determination is positive, then control returns to block 118. The active aerodynamic device is thereby incremented in the second direction until the road load no longer decreases.

If the determination is negative, a second minimum road load and position are stored, as illustrated at block 124. The second minimum road load and position correspond to the minimum road load value measured while the active aerodynamic device was swept in the second direction, and to the active aerodynamic device position at which that road load value was obtained.

The active aerodynamic device is then controlled to the minimum road load position between the first and second stored positions, as illustrated at block 126. Thus, if the first minimum road load is less than the second minimum road load, the active aerodynamic device is controlled to the first position. Likewise, if the second minimum road load is less than the first minimum road load, the active aerodynamic device is controlled to the second position. The active aerodynamic device is thereby controlled to a position corresponding to the least measured road load, regardless of the current calibration.

The calibration for the active aerodynamic device is then updated, as illustrated at block 128. In an exemplary embodiment, this is performed by modifying a lookup table containing actuator settings based on current operating parameters. In some such embodiments, the update may be performed by calculating an offset or multiplier between the position corresponding to the least measured road load and the current calibration. The calculated offset or multiplier is thereafter applied to a plurality of settings in the lookup table, thereby establishing an updated calibration for a range of potential operating parameters. In other such embodiments, only the setting based on current operating parameters is modified, resulting in more limited and granular updates to the lookup table.

The algorithm then terminates at block 130.

In a variant of the above, steps 108 through 126 may be repeated one or more times for verification purposes before updating the calibration at block 128.

In another variant, the algorithm illustrated in FIG. 4 may be performed only in response to a learning mode condition being satisfied, e.g. an operator selection of a learning mode, or an odometer reading being below a predefined threshold corresponding to an initialization period.

In yet another variant, the calibration update performed in block 128 persists only for the duration of a current drive cycle, after which the calibration is restored to a default calibration. The algorithm may thereby accommodate transient changes in vehicle aerodynamic performance, such as attachment of a trailer to the vehicle.

In vehicles having multiple active aerodynamic devices, the algorithm illustrated in FIG. 4 may be performed separately for each active aerodynamic device on the vehicle.

As may be seen, embodiments according to the present disclosure provides a system and method for on-vehicle optimization of the calibration for an active aerodynamic device, thereby reducing time and expense associated with calibrating such calibrations using wind tunnel experimentation or simulations. Moreover, systems and methods according to the present disclosure may modify calibrations for active aerodynamic devices as needed in response to changes in aerodynamic performance such as attachment of a trailer to a vehicle.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising: a body; a movable member disposed on an exterior portion of the body, the movable member having a first position and a second position, the first position having a first aerodynamic profile and the second position having a second aerodynamic profile, distinct from the first aerodynamic profile; an actuator coupled to the movable member and configured to actuate the movable member between the first position and the second position; a sensor configured to, during a drive cycle, detect a relative road load between the second aerodynamic profile and the first aerodynamic profile; and a controller configured to, during a drive cycle, control the actuator to move the movable member to the first position in response to criteria of a first operating condition having been met, to control the actuator to move the movable member to the second position in response to criteria of a second operating condition having been met, and to, in response to the relative road bad being positive, control the actuator to move the movable member to the first position.

2. The automotive vehicle of claim 1, wherein the second operating condition includes vehicle acceleration being below a calibrated acceleration threshold and vehicle speed being above a calibrated speed threshold.

3. The automotive vehicle of claim 1, wherein the first operating condition includes a detected vehicle speed, and wherein the controller is configured to control the actuator to move the movable member to the first position based on an actuator setting obtained from a lookup table based on the detected vehicle speed.

4. The automotive vehicle of claim 1, wherein the actuator is configured to actuate the movable member continuously between the first and second positions.

5. The automotive vehicle of claim 1, wherein the movable member has a third position having a third aerodynamic profile, distinct from the first aerodynamic profile and from the second aerodynamic profile, wherein the actuator is further configured to actuate the movable member to the third position, and wherein the controller is further configured to, in response to the relative road load being negative, control the actuator to move the movable member to the third position.

6. The automotive vehicle of claim 1, wherein the sensor includes a fuel flow sensor configured to monitor fuel consumption or a torque sensor configured to monitor torque output.

7. A method of controlling a vehicle, comprising:
detecting a first vehicle operating condition;
in response to detecting the first vehicle operating condition, automatically controlling, via a controller, an actuator coupled to an active aerodynamic device to a first setting;
detecting a second vehicle operating condition;
in response to detecting the second vehicle operating condition with the actuator in the first setting, automatically controlling, via the controller, the actuator to a second setting;
determining, via the controller, a relative road load between the second setting and the first setting; and
in response to the relative road load being positive, automatically controlling, via the controller, the actuator to the first setting.

8. The method of claim 7, wherein the second vehicle operating condition includes vehicle acceleration being below a calibrated acceleration threshold and vehicle speed being above a calibrated speed threshold.

9. The method of claim 7, wherein the actuator is configured to continuously actuate between the first and second settings.

10. The method of claim 7, further comprising, in response to the relative road load being negative, automatically controlling, via the controller, the actuator to a third setting, wherein the second setting is between the first setting and the third setting.

11. The method of claim 10, further comprising determining, via the controller, a second relative road load between the third setting and the second setting, and, in response to the second relative road load being positive, automatically controlling, via the controller, the actuator to the second setting.

12. The method of claim 11, further comprising storing the second setting in nonvolatile vehicle memory for access during a subsequent drive cycle.

13. The method of claim 7, further comprising automatically controlling, via the controller, the actuator to a third setting, wherein the first setting is between the third setting and the second setting.

14. The method of claim 13, further comprising determining, via the controller, a second relative road load between the third setting and the first setting, and, in response to the second relative road load being positive, automatically controlling, via the controller, the actuator to the first setting.

15. An active aerodynamic system for a vehicle comprising: a movable member disposed on an exterior portion of the vehicle, the movable member having a first position and a second position, the second position being distinct from the first position; an actuator coupled to the movable member and configured to actuate the movable member between the first position and the second position; a sensor configured to, during a drive cycle, detect a relative road load between the second position and the first position; a non-transient data storage provided with an actuator calibration value for the actuator; a controller configured to, during a drive cycle, control the actuator to move the movable member to a first position based on the actuator calibration, in response vehicle acceleration being below a predefined acceleration threshold and vehicle speed being above a predefined speed threshold, with the movable member in the first position, automatically control the actuator to the second position independently from the actuator calibration, and, in response to the relative road load being negative, modify the actuator calibration based on the second position.

16. The vehicle of claim 1, wherein the controller is configured to control the actuator to move the movable member to the second position in response to criteria of a second operating condition having been met independently from the predefined calibration for the actuator.

17. The method of claim 7, wherein the automatically controlling the actuator to the first setting is performed according to a predefined calibration for the actuator, and wherein the automatically controlling the actuator to the second setting is performed independently from the predefined calibration.

* * * * *